United States Patent [19]
Griff

[11] 3,837,074
[45] Sept. 24, 1974

[54] COAXIAL INTERCONNECTIONS

[75] Inventor: William Griff, Tarzana, Calif.

[73] Assignee: The Bunker-Ramo Corporation, Oak Brook, Ill.

[22] Filed: July 8, 1970

[21] Appl. No.: 56,159

Related U.S. Application Data

[63] Continuation of Ser. No. 753,263, Aug. 16, 1968, abandoned.

[52] U.S. Cl. .......................... 29/624, 156/3, 174/36, 174/685
[51] Int. Cl. .......................... H01b 13/00, H05k 3/00
[58] Field of Search .................. 174/68.5, 35 R, 36; 260/830 P; 29/625, 626, 624

[56] References Cited

UNITED STATES PATENTS

| | | | |
|---|---|---|---|
| 3,336,415 | 8/1967 | Kennedy | 260/830 P X |
| 3,499,219 | 10/1970 | Griff et al. | 29/624 |

FOREIGN PATENTS OR APPLICATIONS

| | | | |
|---|---|---|---|
| 986,190 | 3/1965 | Great Britain | 260/830 P |

*Primary Examiner*—Darrell L. Clay
*Attorney, Agent, or Firm*—F. M. Arbuckle; N. Cass

[57] ABSTRACT

A structure and fabrication method therefor for supporting and interconnecting electrical circuit components. The structure defines electrically conductive paths between and electrically isolated from conductive planar members by embedment in an elastomeric dielectric comprising a preblended mixture of a thermosetting resin such as an epoxy and not more than 20 percent by weight of a thermoplastic resin such as a polyamide. The structure is fabricated by removing material from a conductive planar member to form a recess extending into said planar member, placing a sheet of said dielectric adjacent the recessed surface and filling said recess with said dielectric by applying heat and pressure to said sheet.

3 Claims, 7 Drawing Figures

INVENTOR.
WILLIAM GRIFF
BY
Lindenberg + Freilich

COAXIAL INTERCONNECTIONS

This patent application is a continuation of U.S. Pat. application Ser. No. 753,263, filed Aug. 16, 1968, now abandoned.

The invention herein described was made in the course of or under a contract or subcontract thereunder, with the United Sates Army Engineer Research and Development Laboratories.

BACKGROUND OF THE INVENTION

1. Field of the Invention

This invention relates generally to an electrical innerconnection means and a method of fabrication thereof and more particularly, to means useful for interconnecting microminiaturized high-speed electronic circuits.

As the switching and clock rates of various systems, such as digital data processing systems, are increased, the characteristics of the circuit interconnection means employed in such systems become significant. That is, whereas the characteristics of the interconnection means are of little importance when used with relatively low frequency signals, they can have a pronounced effect on the system performance when the transient durations (rise and fall times) of the signals become a significant fraction of the time required to propagate the signals between circuits or components. Additionally, system performance is greatly affected when signal propagation time between circuits is not negligible in comparison with the system clock period. Thus, where the transient durations become greater than 5 to 10 percent of the signal propagation time between circuits via the interconnecting means, the interconnecting means should be regarded as a distributed circuit element and therefore should be considered as an integral part of the circuitry itself if accurate and predictable results are to be achieved. Therefore, where the signal propagation time is significant, the interconnection means should be viewed as a transmission line and transmission line theory should be applied to achieve proper circuit and system designs.

Recognizing that the interconnection means should be considered as a transmission line, it follows that the line should be uniform and properly terminated with respect to impedance if signal reflections and resulting distortions are to be prevented. That is, if the physical and electrical properties of the interconnection means are not uniform, then the nonuniformities (gradual or abrupt) appear as changes in the characteristic impedance resulting in signal reflections. Such reflections can have a detrimental effect on circuit performance by, for example, resulting in triggering delays. When interconnection propagation time becomes comparable to the clock period, reflections become especially troublesome because the reflected signal, if not sufficiently attenuated, can spill over into the logic allocation for the next clock period, thus causing circuit malfunctions.

In addition to signal distortion problems resulting from signal reflection, cross-talk problems resulting from coupling between adjacent circuits become significant in high-speed circuitry because of the rates of change in the electric and magnetic fields during transients. These problems can of course become of special importance when high interconnection densities are desired for compatibility with microminiature circuits.

2. Description of the Prior Art:

In view of the foregoing considerations, various attempts have been made in the prior art to develop techniques for interconnecting high-speed circuits, and more particularly, high-speed microminiaturized circuits. Some of these early techniques are discussed in U.S. Pat. Nos. 3,351,816, 3,351,953, and 3,351,702 which disclose improved means for interconnecting high-speed circuits. More particularly, the cited patents disclose an interconnection technique which involves providing planar coaxial interconnections. The interconnection means, according to exemplary embodiments of the cited patents, may be fabricated by filling troughs formed in opposed surfaces of two conductive plates with dielectric, disposing an elongated conductor between the filled troughs and assembling the plates together so as to surround the conductor with dielectric. Interconnections, effectively consituting coaxial transmission lines, are formed using the conductive plates as ground planes. The resulting structure provides uniform self-shielded transmission lines well suited for the contemplated applications.

A further interconnection structure is disclosed in U.S. Pat. application Ser. No. 680,913, filed on Nov. 6, 1967, and assigned to the same assignee as the present application. The interconnection structure disclosed therein is based on the recognition that interconnections between points lying in a common plane defined by a conductive plate can be formed by elongated portions of the plate electrically isolated from the remaining portions of the plate. Such portions can be isolated by etching inwardly from both surfaces of a plate and filling the troughs so etched with dielectric material.

In the fabrication of such dielectric filled troughs, curable liquid systems such as epoxy-anhydride dielectrics have been utilized. However, certain problems have been encountered which under some circumstances hinder the volume production of high performance and uniform quality planar coaxial devices. For example, it has sometimes been found to be very difficult to completely fill small recesses unless special care is taken to remove all bubbles from the system. Moreover, the liquid epoxy-anhydride system requires fairly sophisticated equipment to control the filling operation and considerable time to attain desirable quality assurance for the cured system. Furthermore, clean room conditions must be provided for storage, formulation and application of the material and very precise analytical balances must be utilized for weighing the constituents of the curable liquid dielectric which must then be blended, metered, degassed and applied to the troughs. Still further, the adhesion of the dielectric to the trough or the conductor was not totally satisfactory in all cases.

OBJECTS AND SUMMARY OF THE INVENTION

In accordance with the present invention, in lieu of employing a liquid curable dielectric material to fill the troughs, a preblended sheet of nonconducting film of curable dielectric is utilized.

The film is provided in a prepared condition which is extremely applicable for clean-room operation. The material is in a clean and pore-free condition and can be immediately applied without the need for weighing, blending, degassing, or metering. The film does not require sophisticated equipment or techniques for obtaining a void free system and the processing time is greatly reduced which contributes to substantially decreased occurrence of operator time and costly reject rate.

In a preferred form, the dielectric material is in the form of an unsupported sheet of material having the ability to flow when heated into very small channels to completely fill all cavities without voids. The material should have the ability to adhere sufficiently well to conductive metal surfaces, such as copper or aluminum, to hold electrodeposited or laminated foil circuits or etched through-plane slugs in place. As discussed in the cited patent application, the fully cured dielectric may be exposed to subsequent chemical processing which may involve organic solvent solutions and organic or inorganic caustic or acidic solutions. Therefore, the dielectric should have the ability to withstand contact with these processing solutions without undue deterioration.

The dielectric must have acceptable electrical properties as cured such as dielectric constant, dissipation factor and volume and surface resistivity. In some applications, the dielectric must also have the ability to withstand brief exposure to soldering temperature and longer term exposure to the operating temperatures of models using coaxial circuitry without embrittlement or undue degradation of electrical or physical properties. It would further be desirable that the cured material be compatible with and receptive to electroplating. When the thermal conductivity and coefficient of thermal expansion is in a range to match fairly closely with the corresponding constants of the planar conductive material, tensile and compressive stresses are minimized. When these constants are fairly closely matched, the filled troughs can better withstand temperature cycling without physical or electrical degradation.

These properties are provided in a sheet of dielectric formed from a mixed resin system comprising a major portion of a thermosetting resin and a minor portion, usually below 20 percent by weight, of a thermoplastic resin which cures to form a dielectric exhibiting elastomeric properties.

A suitable sheet of material for the dielectric trough filling application of the invention is formed from a mixture of a thermosetting epoxy resin and a minor amount, below 10 percent and preferably below 5 percent, of a thermoplastic polyamide such as a nylon. A material available on the market is FM–1000 (Bloomingdale Division, American Cyanamid Company), a 97 percent epoxy – 3 percent nylon blend supplied in the form of a film in various thicknesses. One product that has been utilized is a nominal 0.003 inch thickness material having a weight of 0.15 ± 0.005 pounds per square foot. It is a white elastomeric film having a shelf life of over six months at room temperature. It can be cured at temperatures of about 300° to 350° F at 5 to 50 psi and meets specification MIL–A–5090D. The cured material has a dielectric constant of below 4, usually about 3.0. Face to core tension per specification MIL–A–25463 is 1,200 psi.

Due to the presence of this small percentage of thermoplastic polyamide, the adhesive nature of the cured system is greatly improved as is the compatibility with the differential linear thermal coefficient of expansion between the copper substrate and the dielectric. Furthermore, the FM–1000 material readily flows into very small etched channels completely filling the same and cures to a smooth and dense appearing dielectric surface.

The invention will be best understood from the following description when read in conjunction with the accompanying drawings.

Figure 1:
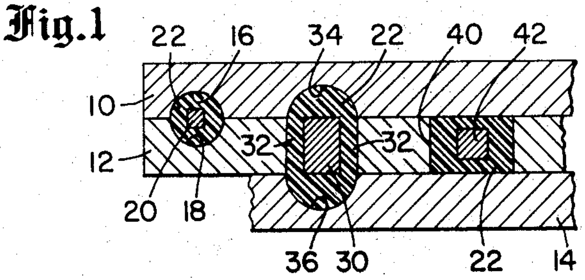
FIG. 1 is a fragmentary sectional diagram illustrating planar coaxial transmission line embodiments in accordance with the present invention.

Attention is now called to FIG. 1 which illustrates a cross-sectional view of various types of planar coaxial transmission lines of the type generally disclosed by the aforecited application and patents. More particularly, the structure of FIG. 1 includes a series of flat conductive plates 10, 12 and 14 disposed in superposed relationship so that the top and bottom surfaces of plate 12 are opposed respectively by the bottom surface of plate 10 and the top surface of plate 14.

A first trough 16 extends into the plate 10 from the bottom surface thereof and a second trough 18 extends into the plate 12 from the top surface thereof. The troughs 16 and 18 are aligned and a central conductor 20 is disposed therebetween. The conductor 20 is substantially completely enveloped by the plates 10 and 12 which are electrically interconnected to form a ground plane. Thus, the conductor 18 in conjunction with the plates 10 and 12 forms an effective coaxial transmission line as disclosed in greater detail in the aforecited patents.

The conductor 20 can be supported in the troughs 16 and 18 and electrically insulated from the plates 10 and 12 by dielectric material 22. As is further disclosed in the aforecited patents, the plates 10 and 12 are intended to be employed in a stack of several plates which together can carry complex interconnection means for interconnecting high-speed electronic circuits. The conductor 20 is intended to connect two spaced points in a single plane and is thus referred to as an in-plane connector. The conductor 20 can be connected to an in-plane connector between two different plates by a through-plane connector (not shown in FIG. 1) which penetrates through a plate but is electrically insulated therefrom. The through-plane connector can comprise a plated-through hole, for example, as shown in the aforecited patents.

Interconnection means substantially functionally equivalent to said first structure are disclosed in said cited application. More particularly, the further interconnection means employs at least three conductive plates 10, 12 and 14 which are electrically interconnected at the boundaries therebetween or by some other means such as internally plated holes which penetrate all three layers. A conductor 30 is formed in plate 12 having its upper and lower surfaces substantially in alignment with the upper and lower surfaces of plate 12. Conductor 30 is isolated from electrical contact with the plates 10, 12, and 14 by forming openings 32 extending through the central plate 12 and elongated in the plane of the plate by forming troughs 34 and 36 in plates 10 and 14 respectively. The openings 32 and the troughs 34 and 36 can be filled with dielectric material 22 which insulates the conductor 30 from the plates and supports the conductor 30 in the openings 32. Thus, it should be appreciated that this structure will yield a device which is electrically substantially equivalent to the first described device.

A further alternative structure in accordance with the present invention which eliminates the need for forming troughs in the upper and lower plates is shown on the righ-hand portion of FIG. 1. More particularly, this structure again utilizes plates 10, 12 and 14 supported in stacked or superposed relationship. The plate 12 defines an opening 40 extending therethrough and elongated in the plane of plate 12. A central conductor 42 is supported in the opening 40 by dielectric material 22. The conductor 42 differs from the conductor 30 in that its thickness has been reduced so that the upper and lower surfaces thereof are effectively recessed with respect to the upper and lower surfaces of the plate 12. That is, both the upper and lower surfaces of the conductor 42 lie between the plates defined by the upper and lower surfaces of the plate 12. As a consequence, the dielectric material 22 not only insulates the conductor 42 from the remainder of plate 12, but in addition, envelops the conductor 42 to insulate it from the upper and lower plates 10 and 14. In order to interconnect the in-plane conductor 30 to conductors disposed between other plates, the conductor 30 may be connected to a through-plane connector (not shown) by connection with corresponding connectors extending through plates 10 and 14. Suitable through-plane connectors are disclosed in U.S. Pat. Application Ser. No. 613,652, filed on Feb. 2, 1967, by Howard L. Parks and assigned to the same assignee as the present application.

Figure 2:
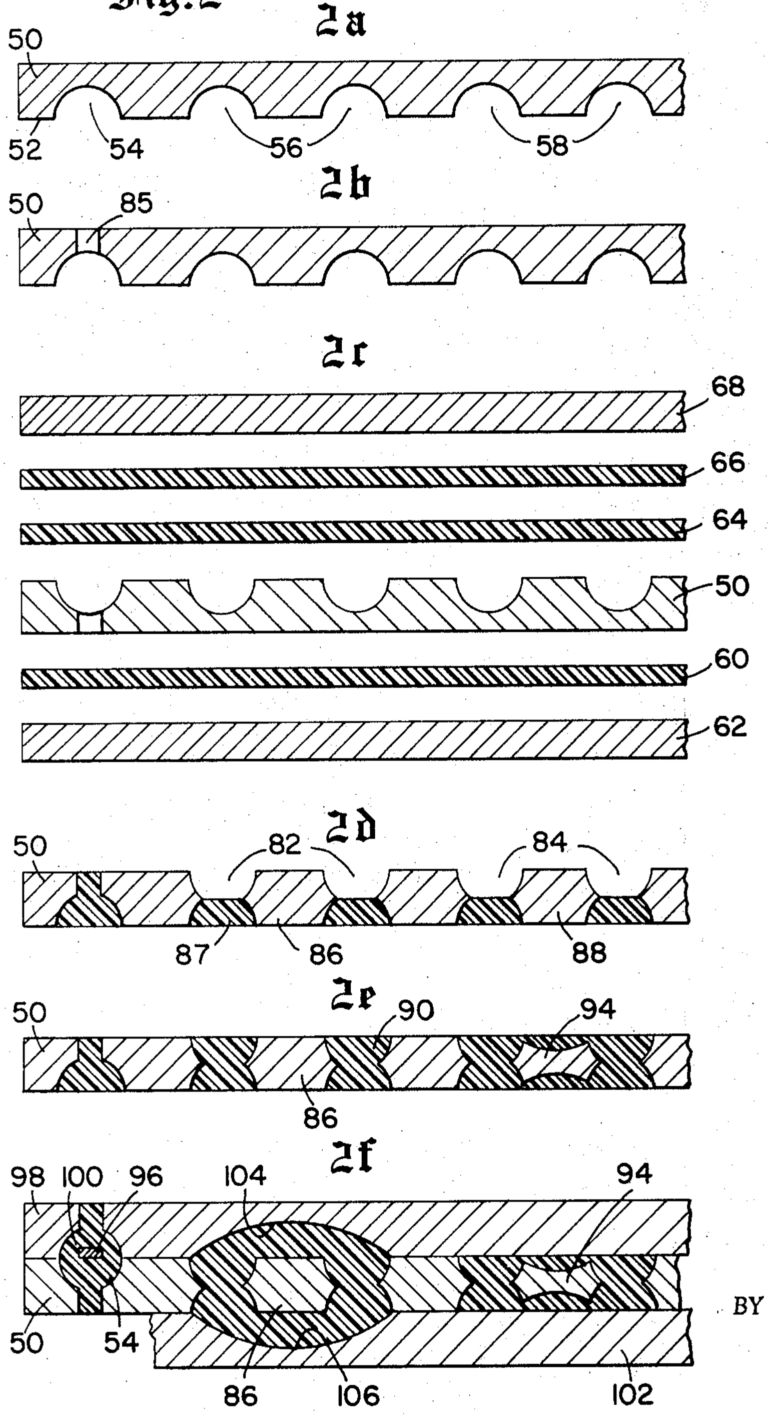
FIG. 2 is comprised of diagramatic illustrations FIGS. 2a to 2f describing a preferred fabrication method in accordance with the present invention.

A preferred method of fabricating embodiments of the present invention is illustrated in FIG. 2 which demonstrates how three different types of conductors are formed. Typically, an aluminum or copper conductive plate 50 having a thickness on the order of 5 to 100 mils or more is initially prepared by shearing it to the desired size. The thickness of the plate 50 will depend upon the desired thickness of the conductor lines. The plate should be provided with an appropriate border area and with registry holes which enable it to be properly aligned for production of art work for photo fabrication processing. The surfaces of the plate 50 are then prepared for the application of a photoresist mask by conventional techniques which may consist of dry sanding and the application of cold solvent degreasing material and other surface treating solutions. A metal etched photoresist is then applied to the bottom surface 52 of the plate 50. The resist is then exposed and all areas except where the straight trough 54 and endless troughs 56 and 58 are to be formed. The exposed areas become etch resistant on exposure and the troughs are then chemically etched, for example, with ferric chloride etchant. The endless troughs 56 and 58 are preferably etched to a depth slightly greater than one-half the plate thickness. The resist can be then completely stripped with a suitable solvent and the plate's surface subsequently cleaned. A ground clearance hole 85 is drilled through the plate 50 into the trough 54 at a site where a through connection is desired.

The etched areas are then filled with dielectric in accordance with the invention. The etched plate is placed between the platens of a laminating press with the etched surface up, the etched surface being covered with at least one continuous homogenous sheet of dielectric material and then with a sheet having release characteristics with respect to said dielectric material. In the alternative, the surface of the top platen may be coated with a release coating. The platens are moved into light engagement with the plate and sheets under light pressure for a short period to evacuate excess air from the assembly. The pressure is then raised to a pressure of at least 200 psi and preferably about 500 psi while the platens are heated to a temperature above the curing temperature of the dielectric. The curing temperature is maintained for a desired cure cycle, suitably for a period of ½ hour to 5 hours with the pressure being maintained. After the cure cycle is completed, the assembly is allowed to cool under pressure while the temperature is gradually reduced to ambient temperature. The assembly is then removed from the press and disassembled. Any dielectric residue may then be removed by sanding.

Referring to FIG. 2(*c*), a Teflon coated Fiberglass slip sheet 60 is placed on an aluminum caul plate 62. The etched copper plate 50 is placed on the slip sheet 60 with the etched surface face up. A sheet 64 of dielectric film is placed on the copper plate 50 which is in turn covered with another slip sheet 66 and a top aluminum caul plate 68. This assembly is placed between the platens of a laminating press and heated under pressure to flow the dielectric into the etched troughs and channels and to cure the dielectric.

Referring now to FIG. 2(*d*), the fabrication of the in-plane conductors is continued by etching endless troughs 82 and 84 in the opposite surface of the plate 50 to a depth sufficient to bare the dielectric 87 and to thus form conductor slugs 86 and 88. The plate 50 is then returned to the laminating press and the troughs 82 and 84 are filled with dielectric material 90. Any excess dielectric material can then be removed from the plate surfaces by sanding to then yield the conductors 86 and 88 surrounded and isolated from the plate by dielectric 90 as indicated in FIG. 2(*e*). Both surfaces of the plate 50 are then again covered with photoresist material and the entire plate exposed except for the top and bottom surfaces of the conductor 88. The surfaces of the conductor 88 are then etched and subsequently filled with dielectric material to yield the recessed conductor 94.

The dielectric filled plate 50 is then assembled to form a coaxial transmission assembly. As illustrated in FIG. 2(*f*), an elongated conductor 96 is formed on the surface of the dielectric in channel 54. The conductor may be a piece of metal foil or may be formed by plating techniques. A top plate 98 having an opposed dielectric filled trough 100 and ground clearance hole is laminated to the plate 50. Holes are drilled through the assembly, within the periphery of the dielectric filled ground clearance holes. Drill speed and rate of spindle feed should be adjusted to avoid overheating and balling of the elastomeric material. Use of a coolant during drilling and longer cure cycles of the dielectric further reduce the effects of local overheating.

The assembly is then metallized with electroless copper followed by a coating of electrodeposited copper of sufficient thickness to provide the required current carrying capacity for the through-hole interconnections. The assembly is photoresisted for selective plating of the through holes. Solder alloy, gold or other type of etch resistant metal is pattern plated on the assembly. The photoresist is removed with a suitable solvent stripper and the exposed copper areas are etched out leaving through-hole plated interconnections between the interlayer conductors and the terminals on the outer surfaces of the assembly.

The conductors 86 and 94 are enveloped by top plate 98 and bottom plate 102 to complete the assembly of the coaxial transmission lines. The inward surface of plates 98 and 102 are recessed to form troughs 104 and 106 which are filled with dielectric 22 according to the method of the invention to complete the isolation of conductor 86 from the plates 98 and 102.

It was illustrated in FIGS. 1 and 2 how coaxial transmission lines can be formed by sandwiching the plate between upper and lower conductive plates which in conjunction with the material of the intermediate plates substantially envelop a conductor formed in the intermediate plate. A plate with dielectric filled channels or troughs can be further processed to yield a coaxial transmission line without utilizing separate top and bottom plates. The plate as shown in FIG. 2 is plated on both its top and bottom surfaces with conductive layers of copper, for example. Such plating may be comprised of an initial electroless copper layer and a subsequent electroplated copper layer. Photoresist material is then applied to the copper layers and the photoresist layers are completely exposed to make them etch resistant except for isolation areas. The copper layers are then etched to yield isolated conductive studs which are electrically connected to the conductors associated with the elongated slugs or with the through-plated holes. The isolation areas are then filled with dielectric material.

The assembly and lamination of the coaxial levels are accomplished by various means. In the case of through hole plated systems, the assembly is laminated by placing a sheet of structural adhesive fiber FM 1044–R between the levels. This material is approximately the same basic composition as FM 1,000 except that it is provided in a more advanced stage of cure and has negligible flow during the lamination cycle. This will preclude any possibility of shorting between adjacent levels.

During the through-hole drilling operation, a series of holes are drilled through specified land areas to provide a common coaxial ground for the system. The cure cycle for FM 1044–R is the same as for FM 1000. In the case of solid interconnecting slugs, the mating copper areas are electroplated with a suitable eutectic solder alloy. The levels are then assembled and aligned in a suitable fixture arrangement, entered into a laminating press and fused together at the proper eutectic temperature.

The following is a description of a preferred embodiment of the invention, it being realized that this example is offered for purposes of illustration only and that numerous substitutions, alterations and modifications are all permissible without departing from the scope of the invention as defined in the claims.

DESCRIPTION OF THE PREFERRED EMBODIMENTS

A 0.010 mil copper metal sheet was chemically etched to form an endless trough for isolating a conductive slug. The etched sheet or plate was prepared for dielectric filling by lightly vaporhoning the etched surface, scrubbing clean the etched surface with Shipley 70 Scrub Cleaner, bristle brush and water. The surface was rinsed thoroughly and dried with clean filtered forced air. A Teflon coated Fiberglass slip sheet was placed on the top surface of an aluminum caul plate. The etched copper board was placed on the slip sheet with the etched surface face up. Two sheets of 0.003 inch thick FM 1,000 film was placed on the copper board which was then covered with another Teflon coated glass slip sheet and the top aluminum caul plate. The assembly was placed between the platens of a laminating press at room temperature. A contact pressure of approximately 20 psi was applied for a period of about five minutes to evacuate air from the assembly. The pressure was raised to approximately 500 psi and the platens heated and adjusted to a temperature of 340° F ± 10° F. A cure cycle at 340° F for a period of about 90 minutes was conducted. With the pressure still being applied, the temperature was reduced to ambient and the assembly was then removed from the press and disassembled. The dielectric residue was removed from the surfaces of the plate by hand sanding with wet and dry sandpaper. The procedure was repeated on the opposed surface of the plate to form the conductive slug.

Microscopic examination of the dielectric filled plate indicated no observable movement of the through-plane slug. Units were held intact by the thermosetting-thermoplastic dielectric system. Filling of the isolation areas was complete with a dense and smooth appearing dielectric surface. The dielectric sheet when heated flowed to completely fill the etched cavities without forming voids. No detrimental deterioration of the filled dielectric areas was evidenced on subsequent chemical processing. Greatly increased reliability and a substantial reduction in fabrication time and complexity was achieved with the process of the invention.

From the foregoing, it should be appreciated that only particular preferred embodiments of the invention have been disclosed for purposes of exemplification and that numerous additions, alterations and modifications are permissible without departing from the scope of the invention as defined in the following claims.

The embodiments of the invention in which an exclusive property or privilege is claimed are defined as follows:

1. In a method of fabricating a microminiature electrical interconnection structure, the steps of:

providing a conductive sheet having a thickness of the order of 5 to 100 mils, chemically etching a plurality of recesses in at least one surface of said sheet having a pattern corresponding to a microminiature electrical circuit to be formed therein, placing at least one sheet of a curable and flowable elastomeric dielectric material adjacent said one surface, said dielectric material being adherable to said conductive sheet and having a thermal conductivity and coefficient of expansion approximately matching said conductive sheet, said dielectric material comprising a mixture of a polyamide thermoplastic resin and an epoxy thermosetting resin in which the polyamide thermoplastic resin comprises below 20 percent by weight of the mixture, applying heat and pressure so as to cause the dielectric material to flow into the recesses and adhere to the surfaces thereof and completely fill the recesses without voids and to cure the dielectric material, said applying being accomplished by initially applying a relatively light pressure between the conductive and dielectric sheets to evacuate excess air therefrom and then applying a relatively greater pressure while heating the assembly above the curing temperature of the dielectric material, the relative pressure being maintained between the conductive and dielectric sheets until after the cooling of the assembly following curing of the dielectric material, and removing excess dielectric material from said one surface.

2. The invention in accordance with claim 1, wherein the step of removing excess dielectric material comprises sanding said one surface until the dielectric material is removed from the conductive surface portions and forms a flush surface with the dielectric portions provided by the filled recesses.

3. In a method of fabricating a microminiature electrical interconnection structure, the steps of:

providing a conductive sheet having a thickness of the order of 5 to 100 mils, forming a plurality of recesses in at least one surface of said conductive sheet having a pattern corresponding to a microminiature electrical circuit to be formed therein, placing at least one sheet of curable and flowable dielectric material adjacent said one surface, said dielectric material being adherable to said conductive sheet and having a thermal conductivity and coefficient of expansion approximately matching said conductive sheet, said dielectric material comprising a mixture of a polyamide thermoplastic resin and an epoxy thermosetting resin in which the polyamide thermoplastic resin comprises below 20 percent by weight of the mixture, placing the resulting assembly of conductive and dielectric sheets between the heatable platens of a laminating press in a manner so as to be releasable therefrom, moving the platens into engagement with the conductive and dielectric sheets to apply relative pressure therebetween while heating the platens above the curing temperature of the dielectric material, the pressure and heating of the platens being such that the dielectric is caused to flow into the recesses and adhere to the surfaces thereof and completely fill the recesses without voids and to cure the dielectric material, cooling the assembly while maintaining relative pressure between the conductive and dielectric sheets, releasing the resulting cured assembly from between the platens, and removing excess dielectric material from said one surface so as to form a single flush surface containing conductive and dielectric portions, the dielectric portions corresponding to the filled recesses.

* * * * *